(12) United States Patent
Wang (10) Patent No.: US 12,253,588 B2
(45) Date of Patent: Mar. 18, 2025

(54) HIGH ANGULAR RESOLUTION PROCESSING METHOD FOR MIMO SYSTEM

(71) Applicant: CUBTEK INC., Zhubei (TW)

(72) Inventor: Hsiao-Ning Wang, Hsinchu County (TW)

(73) Assignee: CUBTEK INC., Zhubei (TW)

( * ) Notice: Subject to any disclaimer, the term of this patent is extended or adjusted under 35 U.S.C. 154(b) by 517 days.

(21) Appl. No.: 17/725,897

(22) Filed: Apr. 21, 2022

(65) Prior Publication Data
US 2023/0127933 A1 Apr. 27, 2023

(30) Foreign Application Priority Data
Oct. 27, 2021 (TW) .................. 110139955

(51) Int. Cl.
*G01S 13/06* (2006.01)
*H04B 7/0456* (2017.01)

(52) U.S. Cl.
CPC ............ *G01S 13/06* (2013.01); *H04B 7/0465* (2013.01)

(58) Field of Classification Search
CPC ...................................... G01S 13/06
See application file for complete search history.

*Primary Examiner* — Timothy A Brainard
*Assistant Examiner* — Helena H Seraydaryan
(74) *Attorney, Agent, or Firm* — Birch, Stewart, Kolasch & Birch, LLP (57) ABSTRACT

A high angular resolution processing method for MIMO system applies a symmetric array antenna for receiving an input signal matrix. The input signal matrix is a transmission signal or reflex signal of at least one target object. The method includes following steps. Step S1: outputting a conversion matrix according to an amount of the symmetric array antenna; step S2: performing a real number conversion using the input signal matrix and a plurality of angle-related pursuit matrixes through the conversion matrix, obtaining a real number input signal matrix and real number pursuit matrixes; and step S3: inputting the real number input signal matrix and the real number pursuit matrixes to an orthogonal matching pursuit model. Obtaining an amount of the target object and an angle of a location corresponding to the target object.

10 Claims, 5 Drawing Sheets

HIGH ANGULAR RESOLUTION PROCESSING METHOD FOR MIMO SYSTEM

BACKGROUND OF THE INVENTION

1. Field of the Invention

The present invention relates to high angular resolution processing methods, and more particularly, to a high angular resolution processing method for MIMO system.

2. Description of the Related Art

Antenna modules are widely used in modern society. For example, in the fields of wireless communication and radar detection, antenna modules are usually applied to transmit and receive wireless signals for signal transmission or position detection. In a multi-antenna signal source environment, it is desirable to resolve the issues of mutual interference among signals, the best signal transmission path, and selection of the optimal signal source in the technical field of antennas.

For instance, mobile phones used by the public transmit network signals and telecommunication signals through the connection between the antennas and the base stations. Therefore, the method of selecting a base station providing better signal connection among a plurality of base stations with different distances and different transmission paths for obtaining better telecommunication signals and network signals becomes an issue needing to be solved in the field of mobile phone communication. In another example, a car radar detection system is mainly applied for detecting objects around the vehicle, so as to confirm and recognize obstacles, thereby assisting the driver to avoid the risk of collision, or even facilitating an automatic driving function. The detection principle of the radar system of vehicle is detecting the distance between the vehicle and the objects around the vehicle through the radar antenna during the moving process of the vehicle. The solution of conventional radar works based on two to three transmitting antennas and three to four receiving antennas. The imaging radar applies a plurality of multiple-input multiple-output (MIMO) antenna arrays for mapping the surrounding environment with high-resolution, thereby providing highly precise image quality without Doppler fuzzy sensing issues under any external environmental conditions and helping to achieve long-distance and wide-view decision making to avoid collisions between the vehicle and an object or another vehicle, so as to prevent traffic accidents.

Regarding the aforementioned technology of searching the most optimal signal for mobile phones and base stations, based on the fact that the signal searching operations of mobile phones and base stations is less related to urgent and dangerous situations, the target signal detection method used by the radar antenna of mobile phone can apply a signal detection method with longer calculation time for repeatedly searching the locations of the base stations and identifying the signal strength of the base stations, so as to receive a stronger signal. Moreover, the position of the base station is fixed, so that the position of the base station is easier to be identified.

However, the radar antenna of the vehicle is applied for preventing collisions during the movement of the vehicle, so that the vehicle radar antenna system has to accurately detect the amounts and locations of objects in a short period of time. The input signal matrix obtained by a general algorithm according to the transmission signal or reflex signal of the target object is a complex number, which includes a real part and an imaginary part. Also, the pursuit matrix (steering vector) used by the algorithm is also a complex number, so the real part and the imaginary part need to be calculated separately in the calculation process, so that the calculation complexity and time of the algorithm are unable to meet the requirements for accurate and rapid identifications of the automotive radar detection system.

SUMMARY OF THE INVENTION

The present invention aims at resolving the issues of a large amount of operation data of the conventional input signal matrix and algorithm, which leads to an increase in the calculation time of the algorithm and a decrease in the detection efficiency of the array antenna.

For achieving the aforementioned objectives, the present invention provides a high angular resolution processing method for MIMO system, which receives an input signal matrix through a symmetric array antenna, wherein the input signal matrix is a transmission signal or reflex signal of at least one target object. The high angular resolution processing method comprises following steps: step S1: outputting a conversion matrix according to an amount of the symmetric array antenna; step S2: performing a real number conversion on the input signal matrix and an angle-related pursuit matrix through the conversion matrix, so as to obtain a real number input signal matrix and a real number pursuit matrix; step S3: inputting the real number input signal matrix and the real number pursuit matrixes to an orthogonal matching pursuit model; when the real number pursuit matrixes fulfill the conditions of the orthogonal matching pursuit model, an amount of target object and a target angle of a location corresponding to the target object are obtained.

With such method, through the step S1 and step S2 of the present invention, the input signal matrix and the pursuit matrix undergo the real number conversion first, so as to obtain the real number input signal matrix and the real number pursuit matrix that include only real numbers, which are then inputted into the orthogonal matching pursuit model. Thus, the orthogonal matching pursuit model only has to perform a one-dimensional real number calculation. Therefore, identification of the target object is accelerated, and the applicable scope of the present invention is not refrained by the speed.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Radar array antennas have various usages, such as object detection, weather observation, object tracking, and so on. The radar array antenna used for detecting objects also applies different algorithms, such as orthogonal matching pursuit (OMP) and MUltiple SIgnal Classification (MUSIC) for signal determination and calculation.

The object detection method of orthogonal matching pursuit (OMP) first compares the correlation between the input signal matrix (reflex signal of the target object received by the radar array antenna) and angle-related steering vector, and then calculates residual value through the residue analysis in regression analysis according to the correlation between the input signal matrix and the steering vector, so as to obtain the amount and the positional angle of the object. OMP has the property of fast calculation. However, to achieve the fast calculation, the detection accuracy of OMP is not optimal. In other words, OMP can only identify the target object in a certain angular range, instead of obtaining a precise angle information of the target object.

Figure 1:
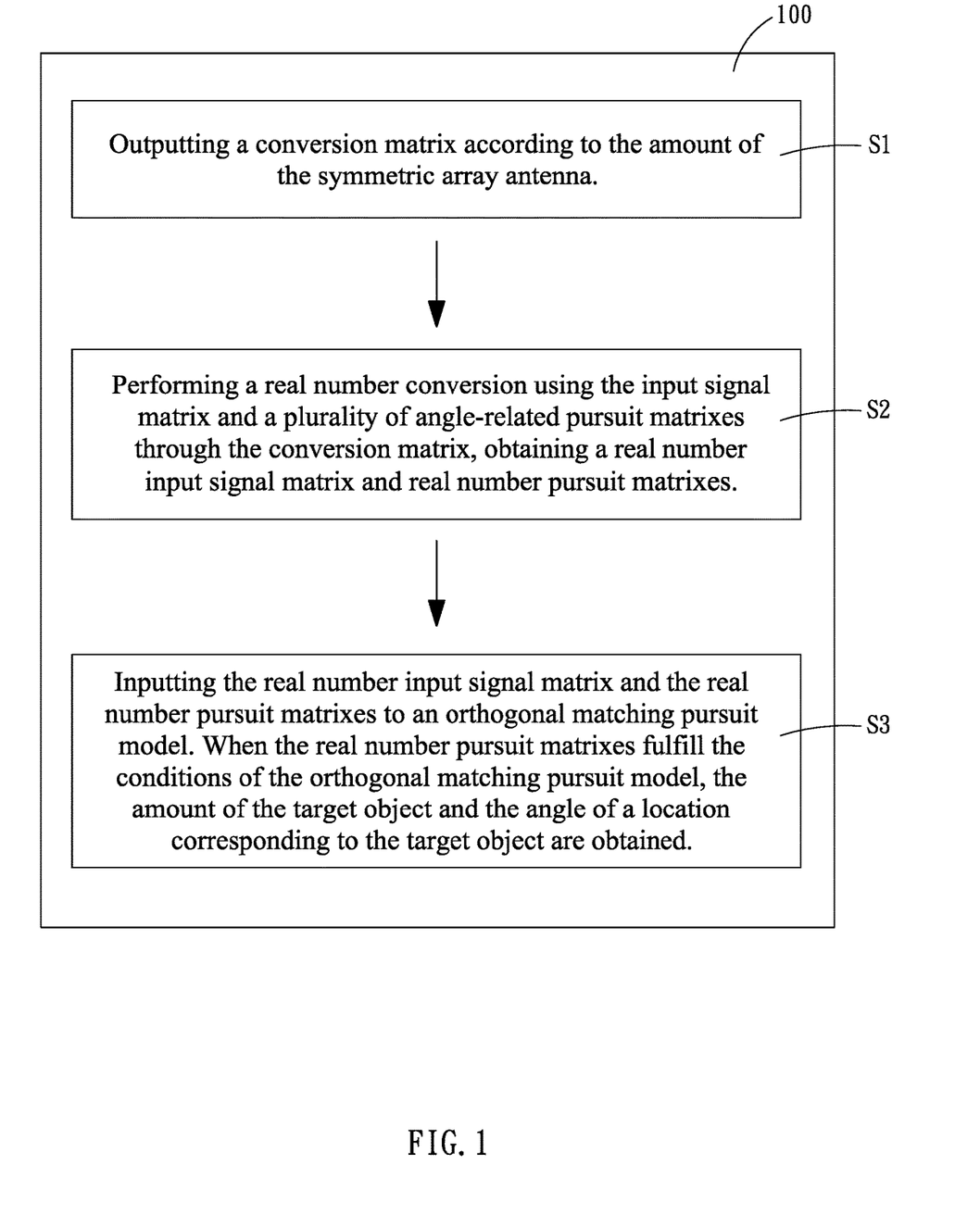
FIG. 1 is a flow chart of the high angular resolution processing method for MIMO system in accordance with an embodiment of the present invention.
Figure 2:
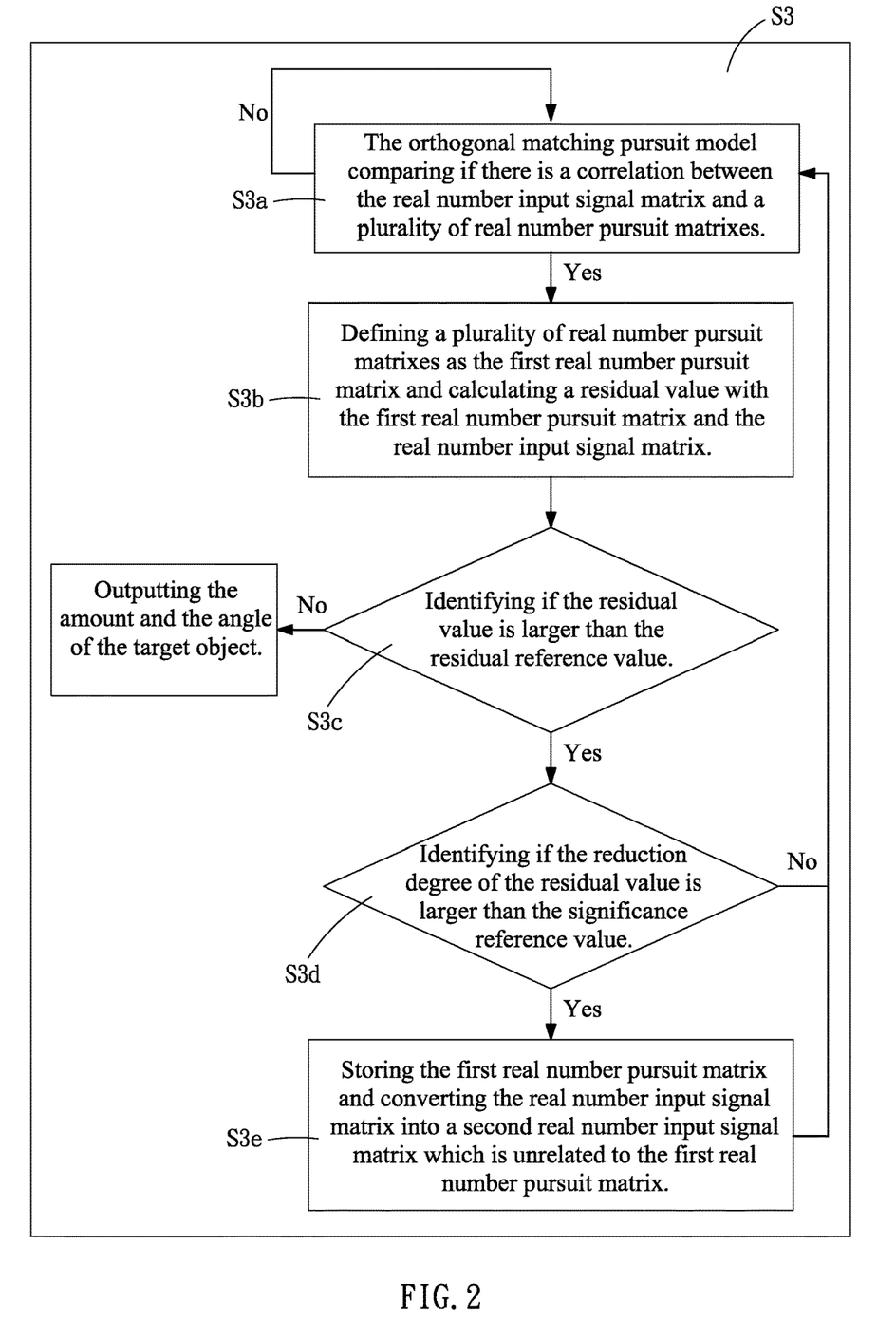
FIG. 2 is a detailed flow chart of step S3 in accordance with an embodiment of the present invention.

Referring to FIG. 1 and FIG. 2, the high angular resolution processing method for MIMO system 100 in accordance with an embodiment of the present invention is illustrated, which receives an input signal matrix through a symmetric array antenna, wherein the input signal matrix is the transmission signal or reflex signal of at least one target object. Therein, the symmetric array antenna is presented in a mirror-symmetric arrangement. For example, if the number of antennas of the symmetric array antenna is five, the third antenna of the symmetric array antenna is a symmetry point, so that the symmetric array antenna is formed in a mirror symmetry. If the number of antennas of the symmetric array antenna is four, the center point between the second antenna and the third antenna of the symmetric array antenna is the symmetry point, so that the symmetric array antenna can be formed in a mirror symmetry.

Therein, in the embodiment of the present invention, the input signal matrix is obtained from the reflex signal which is reflected by the target object and received by the radar array antenna disposed on the vehicle, so as to be applied in an advanced driver assistance system (ADAS), for example but not limited to, being used for forward collision warning (FCW) or blind spot detection (BSD) function. The method of the present invention can be used for the detection of number, position and angle of the target objects. The present invention can also be applied for identifying connections between the mobile phones and the base stations. Regarding connection signal of mobile phones, the mobile phone needs to perform the connection detection with respect to a plurality of base stations to determine the optimal base station for connection, so that the method of the present invention is applicable as well. The present invention comprises following steps:

Step S1: outputting a conversion matrix C according to the antenna amount of the symmetric array antenna. Therein, the step S1 is performed by a processor. In step S1, if the amount of antenna of the symmetric array antenna is in an odd number, the conversion matrix is an odd number conversion matrix. If the amount of antenna of the symmetric array antenna is in an even number, the conversion matrix is an even number conversion matrix.

Moreover, the odd number conversion matrix is $$C = \frac{1}{\sqrt{2}}\begin{pmatrix} I_n & 0_{n\times 1} & jI_n \\ 0_{1\times n} & \sqrt{2} & 0_{1\times n} \\ J_n & 0_{n\times 1} & -jJ_n \end{pmatrix},$$

and the even number conversion matrix is $$C = \frac{1}{\sqrt{2}}\begin{pmatrix} I_n & jI_n \\ J_n & -jJ_n \end{pmatrix}.$$

Therein, the C is the aforementioned odd number conversion matrix or even number conversion matrix. The $I_n$ is a unit matrix. The $J_n$ is an Exchange matrix. The j is an imaginary number unit.

Step S2: performing a real number conversion on the input signal matrix and a plurality of angle-related pursuit matrixes through the conversion matrix, so as to obtain a real number input signal matrix and a plurality of real number pursuit matrixes. Therein, the step S2 is performed through a function calculator. The input signal matrix and the plurality of pursuit matrixes are multiplied by the odd number conversion matrix or the even number conversion matrix, and then undergo the real number conversion, so as to obtain the real number input signal matrix and the plurality of real number pursuit matrixes. Therein, the plurality of pursuit matrixes is formed of the angle-related steering vector. The steering vector is presented by formula (1):

$$v(k) = \begin{bmatrix} e^{-jk\sin\theta_1} \\ e^{-jk2\sin\theta_2} \\ \vdots \\ e^{-jkn\sin\theta_n} \end{bmatrix} \quad (1)$$

Therein, the v(k) is the steering vector.

Further, the input signal matrix and the plurality of pursuit matrixes are calculated through the formula (2) and formula (3) below, so at to obtain the real number input signal matrix and the plurality of real number pursuit matrixes.

$$y_{real} = \text{real}(C \times y) \quad (2):$$

Therein, the $y_{real}$ is the real number signal matrix. The C is the odd number conversion matrix or the even number conversion matrix. The y is the input signal matrix.

$$a(\theta)_{real} = \text{real}(C \times a(\theta)) \quad (3):$$

Therein, the $a(\theta)_{real}$ is the real number pursuit matrix. The C is the odd number conversion matrix or the even number conversion matrix. The $a(\theta)$ is the pursuit matrix.

Step S3: inputting the real number input signal matrix and the plurality of real number pursuit matrixes to an orthogonal matching pursuit model. When the plurality of real number pursuit matrixes fulfill the conditions of the orthogonal matching pursuit model, a target object amount and a target angle of a location corresponding to the target object are obtained.

In the embodiment of the present invention, the present invention applies step S3a, step S3b, step S3c, step S3d, and step S3e to identify if the plurality of real number pursuit matrixes fulfill the conditions of the orthogonal matching pursuit calculation model. Step S3a, step S3b, step S3c, step S3d, and step S3e are explained as follows:

Step S3a: the orthogonal matching pursuit model compares the correlation between the real number input signal matrix and the plurality of real number pursuit matrixes. If there is no correlation between one of the plurality of real number pursuit matrixes and the real number input signal matrix, the step S3a is repeated, so as to compare the correlation between the next plurality of real number pursuit matrix and the real number input signal matrix. If there is a correlation between one of the plurality of real number pursuit matrixes and the real number input signal matrix, the method proceeds to step S3b.

Furthermore, the angle of the plurality of real number pursuit matrixes ranges from −90 degrees to 90 degrees; the corresponding plurality of real number pursuit matrixes are orderly compared with the real number input signal matrix for correlation based on an interval angle unit. Therein, the correlation comparison compares the angular correlation between the plurality of real number pursuit matrixes and the real number input signal matrix. The value of the interval angle is between 1/18 and 1/180 (1 degree to 10 degrees) of the angle scope of the plurality of real number pursuit matrixes. The user is allowed to set up the interval angle according to the actual demands.

Step S3b: defining the plurality of real number pursuit matrixes related to the real number input signal matrix as a first real number pursuit matrix, and performing a residual value calculation using the first real number pursuit matrix and the real number input signal matrix. Therein, in the embodiment, the orthogonal matching pursuit model uses the least square method for residual value calculation.

Step S3c: comparing the residual value and a residual reference value. If the residual value presents a singular sharp reduction and is lower than or equal to the residual reference value (indicating that the first real number pursuit matrix fulfills the conditions of the orthogonal matching pursuit model), the orthogonal matching pursuit model obtains the amount and the angle of the target object. If the residual value is larger than the residual reference value, the method proceeds to step S3d. Therein, if the residual value is larger than the residual reference value, it is indicated that there may be a plurality of target objects, or that there is a correlation between the first real number pursuit matrix and the real number input signal matrix, but the correlation is minor.

Step S3d: comparing the reduction degree of the residual value. If the reduction degree of the residual value is larger than a significance reference value, it is indicated that there is a major correlation between the first real number pursuit matrix and the real number input signal matrix; so, the method proceeds to step S3e. If the reduction degree of the residual value is smaller than the significance reference value, the method goes back to step S3a to repeat the correlation comparison between the real number input signal matrix and other plurality of real number pursuit matrixes, until that the residual value above mentioned is smaller than or equal to the residual reference value, whereby the orthogonal matching pursuit model obtains the amount and the angle of the target object. Therein, when the reduction degree of the residual value is smaller than the significance reference value, it is indicated that there is a correlation between the first real number pursuit matrix and the real number input signal matrix, but the correlation is minor.

Step S3e: storing the first real number pursuit matrix, and converting the real number input signal matrix into a second real number input signal matrix unrelated to the first real number pursuit matrix; also, the method goes back to step S3a to perform the correlation comparison between the second real number input signal matrix and other plurality of real number pursuit matrixes, until that the residual value mentioned is smaller than or equal to the residual reference value, whereby the orthogonal matching pursuit model obtains the amount and the angle of the target object.

Figure 3:
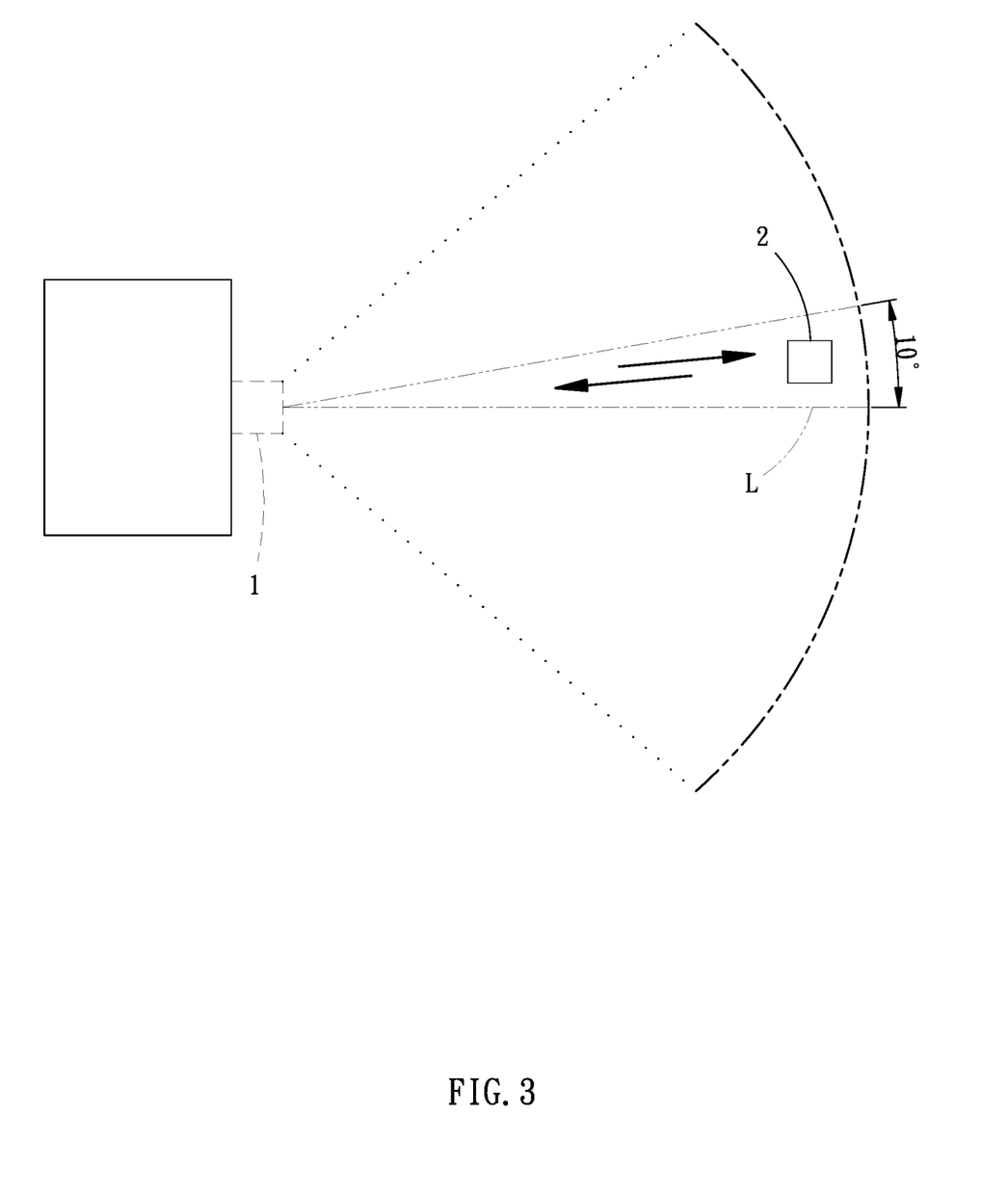
FIG. 3 is a schematic view of the operation status in accordance with the first embodiment of the present invention, illustrating that only one target object exists.
Figure 4:
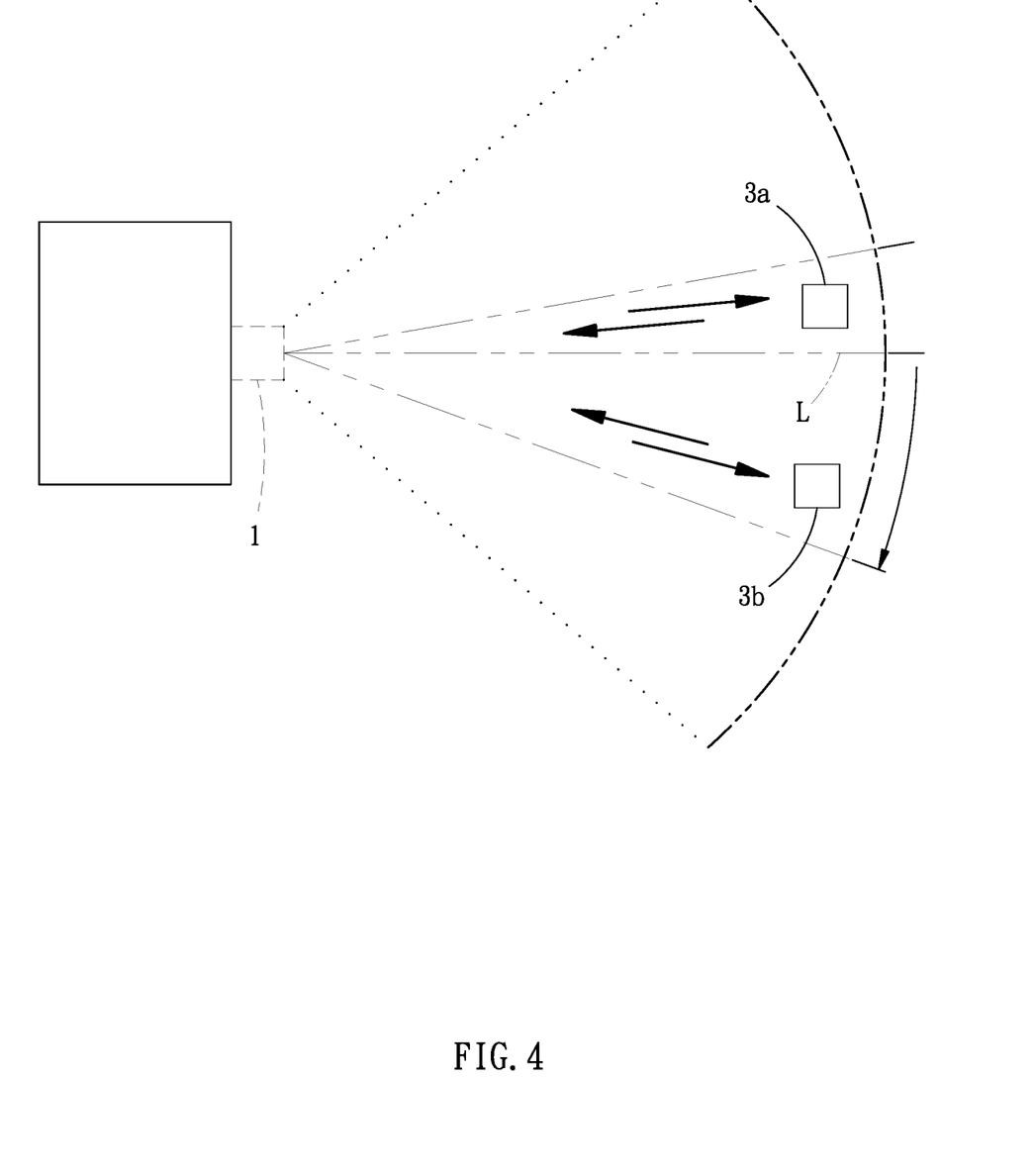
FIG. 4 is a schematic view of the operation status in accordance with the second embodiment of the present invention, illustrating that at least two target objects exist.

Referring to FIG. 3 and FIG. 4, a vehicle radar 1 is provided, which has an odd number of antennas that are arranged in mirror-symmetric arrangement. The vehicle radar 1 has a detection reference line L, which is arranged in perpendicular to the vehicle radar 1. In the drawing, a direction upward from the detection reference line L is defined as the negative direction, and a direction downward from the detection reference line L is defined as the positive direction. Therein, as shown in FIG. 3 which is in accordance with the first embodiment of the present invention, taking the detection reference line L as the basis, an object 2 exists at an angle of −10 degrees with respect to the vehicle radar 1. As shown in FIG. 4 which is in accordance with the second embodiment of the present invention, taking the detection reference line L as the basis, a first object 3a and a second object 3b exist, wherein the first object 3a is located at −10 degrees with respect to the vehicle radar 1, and the second object 3b is located at 20 degrees with respect to the vehicle radar 1. Regarding the first embodiment of the present invention, the actual detection steps are illustrated below:

Referring to FIG. 1 to FIG. 3, in step S1, the processor outputs the conversion matrix (including the odd number conversion matrix and the even number conversion matrix) according to the antenna amount of the symmetric array antenna. In the first embodiment, the antenna amount of the vehicle radar 1 is an odd number, and the antennas are arranged in mirror-symmetric arrangement, the processor correspondingly outputs the odd number conversion matrix.

In Step S2, the function calculator multiplies the input signal matrix and the plurality of pursuit matrixes by the conversion matrix (including the odd number conversion matrix and the even number conversion matrix), and then performs the real number conversion, so as to obtain the real number input signal matrix and the plurality of real number pursuit matrixes. Therein, the input signal matrix is obtained from the reflex signal received by the vehicle radar 1 from the object 2. The plurality of pursuit matrixes are formed of the angle-related steering vectors, and the scope of the plurality of pursuit matrixes ranges from −90 to 90 degrees.

In the first embodiment, the input signal matrix and the plurality of pursuit matrixes multiplies by the odd number conversion matrix, and then performs the real number conversion, so as to obtain the real number input signal matrix and the plurality of real number pursuit matrixes.

In step S3, the real number input signal matrix is entered into the orthogonal matching pursuit model, and the plurality of real number pursuit matrixes are also inputted for comparison. When the plurality of real number pursuit matrixes fulfill the conditions of the orthogonal pursuit model, the amount and the angle of the target object are obtained. In step S3, steps S3a to S3e are applied to determine if the plurality of pursuit matrixes fulfill the conditions of the orthogonal matching pursuit model.

In step S3a, the orthogonal matching pursuit model compares the correlation between the plurality of real number pursuit matrixes with the real number input signal matrix according to each interval angle unit from −90 to 90 degrees. If one of the real number pursuit matrixes has no correlation with the real number input signal matrix, step S3a is repeated.

In the first embodiment, the set-up interval angle is 5 degrees. For example, when the orthogonal matching pursuit model compares the correlation between the plurality of real number pursuit matrixes at −40 degrees and the real number input signal matrix, based on the fact that the object 2 is at an angle (−10 degrees) which is significantly different from the angle (−40 degrees) of the real number pursuit matrixes, the orthogonal matching pursuit model determines that there is no correlation between the real number pursuit matrixes at −40 degrees and the real number input signal matrix. Then, the orthogonal matching pursuit model repeats step S3*a* for performing the correlation comparison between the real number pursuit matrixes at the next angle and the real number input signal matrix.

In contrast, if there is a correlation between one of the real number pursuit matrixes and the real number input signal matrix, step S3*b* is performed. In the first embodiment, when the orthogonal matching pursuit model performs the correlation comparison between the plurality of real number pursuit matrixes at −10 degrees and the real number input signal matrix, based on the fact that the object 2 is at an angle (−10 degrees) which is identical from the angle (−10 degrees) of the plurality of real number pursuit matrixes, the orthogonal matching pursuit model determines that there is a correlation between the plurality of real number pursuit matrixes at −10 degrees and the real number input signal matrix, and the step S3*b* is then performed.

In step S3*b*, the plurality of real number pursuit matrixes that are correlated with the real number input signal matrix are defined as the first real number pursuit matrix. The orthogonal matching pursuit model, according to the first real number pursuit matrix and the real number input signal matrix, performs the least square method for calculating the residual value.

In the first embodiment, the orthogonal matching pursuit model defines the plurality of real number pursuit matrixes at −10 degrees as the first real number pursuit matrix, and accordingly calculates the residual value. Therein, the initial value of the residual value is 100%.

In step S3*c*, the residual value is compared with the residual reference value. If the residual value presents a singular sharp reduction and is lower than or equal to the residual reference value, it is indicated that the first real number pursuit matrix fulfills the conditions of the orthogonal matching pursuit model, and the orthogonal matching pursuit model can obtain the amount and the angle of the target object. If the residual value is larger than the residual reference value, step S3*d* is performed.

In the first embodiment, the residual reference value is set at 10%, and the calculated residual value is 5%. Because only one object 2 exists, and the positional angle (−10 degrees) of it is identical to the angle (−10) of the first real number pursuit matrix, the residual value presents a singular sharp reduction to be lower than the residual reference value (5%<10%). Therefore, the orthogonal matching pursuit model obtains that the target angle is −10 degrees. Also, because the residual value is lower than the residual reference value (5%<10%) after a singular sharp reduction, the orthogonal matching pursuit model obtains the fact that there is only one target object.

Based on the fact that, in the first embodiment, the amount (1) and angle (−10 degrees) of the target object are obtained in step S3*c*, the objective (obtaining the amount and the angle of the target object) of step S3 is achieved, so that step S3*d* and step S3*e* are saved.

Accordingly, referring to FIG. 3, in the first embodiment, the vehicle radar 1 detects that there is an object 2 located at the angle of −10 degrees through steps S1 to S3, and no other objects exist at other angles.

Regarding the second embodiment of the present invention, the actual detection steps are illustrated below. Therein, the vehicle radar 1 in the second embodiment is identical to that in the first embodiment, steps S1 and S2 of the second embodiment are also identical to that of the first embodiment, and illustrations thereof are saved.

Referring to FIG. 1, FIG. 2, and FIG. 4, in step S3, the real number input signal matrix is inputted into the orthogonal matching pursuit model, and the plurality of real number pursuit matrixes are inputted for comparison. When the plurality of real number pursuit matrixes fulfill the conditions of the orthogonal matching pursuit model, the amount and the angle of the target object are obtained. The step S3 determines if the plurality of real number pursuit matrixes fulfill the conditions of the orthogonal matching pursuit model through steps S3*a* to S3*e*.

In step S3*a*, the orthogonal matching pursuit model orderly compare the correlation between the plurality of real number pursuit matrixes and the real number input signal matrix based on different interval angles from −90 degrees to 90 degrees. When there is no correlation between one of the plurality of real number pursuit matrixes and the real number input signal matrix, the step S3*a* is repeated.

In the second embodiment, the first interval angle is set 5 degrees. For example, when the orthogonal matching pursuit model compares the correlation between the plurality of real number pursuit matrixes at −40 degrees and the real number input signal matrix, based on the fact that the angle of the first object 3*a* (−10 degrees) and the angle of the second object 3*b* (20 degrees) are significantly different from the angle (−40 degrees) of the plurality of real number pursuit matrixes, the orthogonal matching pursuit model determines that there are no correlations between the plurality of real number pursuit matrixes at −40 degrees and the real number input signal matrix. Then, the orthogonal matching pursuit model repeats the step S3*a* for performing the correlation comparison between the real number pursuit matrixes at the next angle and the real number input signal matrix.

In contrast, if there is a correlation between one of the plurality of real number pursuit matrixes and the real number input signal matrix, step S3*b* is performed. In the second embodiment, when the orthogonal matching pursuit model performs the correlation comparison between the plurality of real number pursuit matrixes at −15 degrees and the real number input signal matrix, based on the fact that the first object 3*a* is at an angle (−10 degrees) which is slightly different from the angle (−15 degrees) of the plurality of real number pursuit matrixes, the orthogonal matching pursuit model determines that there is a correlation between the plurality of real number pursuit matrixes at −15 degrees and the real number input signal matrix, and the step S3*b* is then performed.

In step S3*b*, the plurality of real number pursuit matrixes that are correlated with the real number input signal matrix are defined as the first real number pursuit matrix. The orthogonal matching pursuit model, according to the first real number pursuit matrix and the real number input signal matrix, performs the least square method for calculating the residual value.

In the second embodiment, the orthogonal matching pursuit model defines the plurality of real number pursuit matrixes at −15 degrees as the first real number pursuit matrix, and accordingly calculates the residual value. Therein, the initial value of the residual value is 100%.

In step S3*c*, the residual value is compared with the residual reference value. If the residual value presents a singular sharp reduction and is lower than or equal to the residual reference value, it is indicated that the first real number pursuit matrix fulfills the conditions of the orthogonal matching pursuit model, and the orthogonal matching pursuit model can obtain the amount and the angle of the target object. If the residual value is larger than the residual reference value, step S3d is performed.

In the second embodiment, the residual reference value is set at 10%, and the calculated residual value is 90%. The residual value is still larger than the residual reference value (90%>10%), so that the method has to proceed to the next step (step S3d).

In step S3d, the reduction degree of the residual value is compared. If the reduction degree of the residual value is smaller than the significance reference value, the method goes back to step S3a to repeat the correlation comparison between the real number input signal matrix and other plurality of real number pursuit matrixes, until that the residual value above mentioned is smaller than the residual reference value. When the reduction degree of the residual value is larger than the significance reference value, step S3e is performed.

In the second embodiment, the significance reference value is set at 35%, and the calculated residual value is 90%. However, the reduction degree (10% reduction) of the residual value is smaller than the significance reference value (35%), meaning that there is a correlation between the first real number pursuit matrix (at −15 degrees) and the real number input signal matrix, but the correlation is not major. Therefore, the orthogonal matching pursuit model goes back to step S3a to perform the correlation comparison between the real number input signal matrix and the next plurality of real number pursuit matrixes (at −10 degrees).

Accordingly, the orthogonal matching pursuit model repeats steps S3a to S3d. In step S3a, because the angle (−10 degrees) of the first object 3a is identical to the angle (−10 degrees) of the plurality of real number pursuit matrixes, the orthogonal matching pursuit model determines that there is a correlation between the plurality of real number pursuit matrixes at −10 degrees and the real number input signal matrix. In step S3b, the plurality of real number pursuit matrixes at the angle of −10 degrees are defined as the first real number pursuit matrix, and the residual value is accordingly calculated.

Meanwhile, the initial value of the residual value is 90%. In step S3c, the calculated residual value is 50%, and the residual value is still larger than the residual reference value (50%>10%). Therefore, the method has to proceed to S3d. In step S3d, the reduction degree of the residual value (reduced by 40% from 90% to 50%) is larger than the significance reference value (35%), so that the method proceeds to step S3e. Therein, the reduction degree (40%) of the residual value is larger than the significance reference value, meaning that there is a major correlation between the first real number pursuit matrix (at the angle of −10 degrees) and the real number input signal matrix.

In step S3e, the first real number pursuit matrix is stored, and the real number input signal matrix is converted into the second real number input signal matrix which is unrelated to the first real number pursuit matrix; also, the method goes back to step S3a to perform the correlation comparison between the second real number input signal matrix and other plurality of real number pursuit matrixes, until that the residual value is lower than or equal to the residual reference value, whereby the orthogonal matching pursuit model obtains the amount and the angle of the target object.

In the second embodiment, the first real number pursuit matrix (at −10 degrees) is stored, and the real number input signal matrix is converted into the second real number input signal matrix (unrelated to the angle of −10 degrees) which is unrelated to the first real number pursuit matrix (at −10 degrees).

Then, the method goes back to step S3a to perform the correlation comparison between the second real number input signal matrix and next plurality of real number pursuit matrixes (at the angle of −5 degrees), until that the residual value is lower than or equal to the residual reference value (10%). Therein, the first real number pursuit matrix (at −10 degrees) is stored, meaning that one of the angles of the target objects is −10 degrees.

In the second embodiment, the orthogonal matching pursuit model determines that, through steps S3a to S3e, there are two target objects (first object 3a and second object 3b), and the angles of the target objects are −10 degrees and 20 degrees, respectively.

Accordingly, referring to FIG. 4, in the second embodiment, the vehicle radar 1 detects that, through steps S1 to S3, there are a first object 3a located at the angle of −10 degrees and a second object 3b located at the angle of 20 degrees, with no other objects existing at other angles.

Furthermore, taking a processor (TDA2) of an advanced driver assistance system (ADAS) as an example, if the processor (TDA2) applies the conventional orthogonal matching pursuit (OMP) algorithm, the calculation rate is 530 microseconds; if the processor (TDA2) applies the method of the present invention, the calculation rate is 118 microseconds. Accordingly, the method of the present invention is nearly 4.5 times faster than the original orthogonal matching pursuit (OMP) algorithm.

Figure 5:
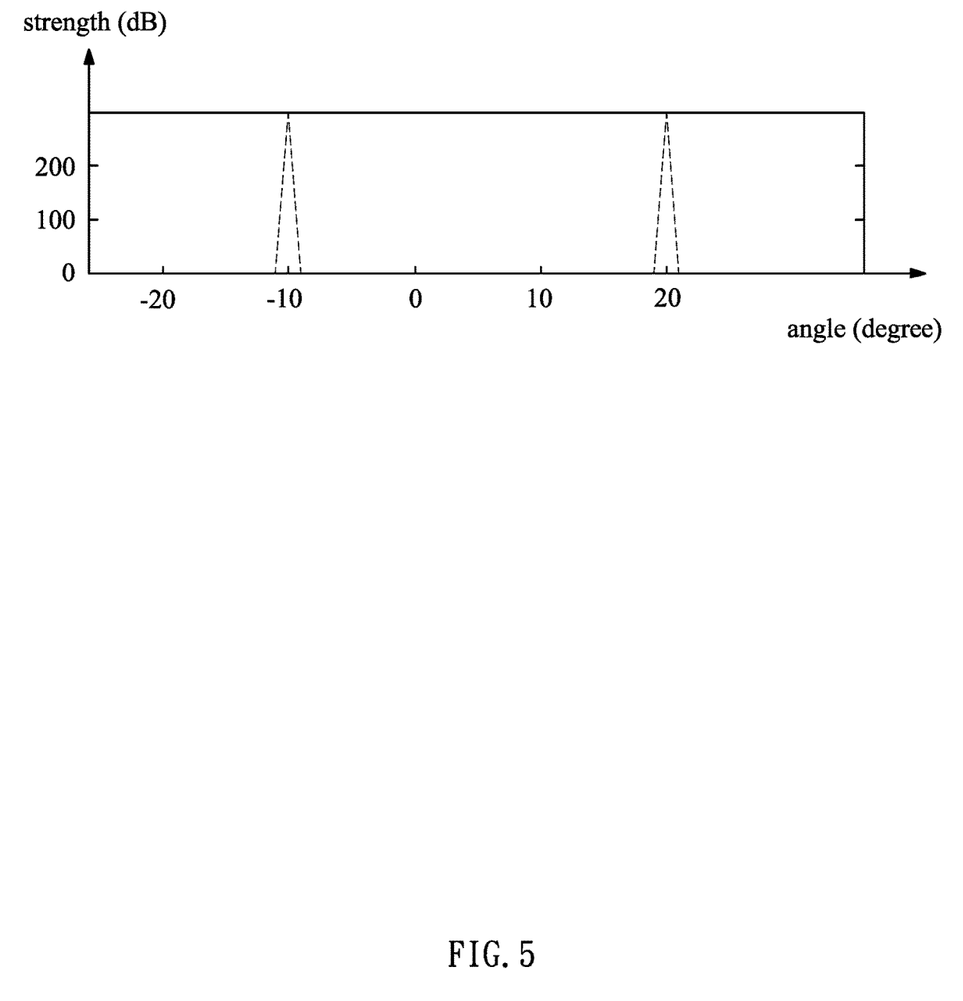
FIG. 5 is a curve diagram of the second embodiment of the present invention, illustrating that the target objects are located at a 10-degree location and a 20-degree location, respectively.

Also, in the embodiment of the present invention, after the calculation of steps S1 to S3, the curve of the angle and the performance can be obtained. Referring to FIG. 5, in the second embodiment, because the angle of the first object 3a is −10 degrees and the angle of the second object 3b is 20 degrees, the curve only shows at the positions of −10 degrees and 20 degrees, with an obvious peak showing that the angles of the target objects are −10 degrees and 20 degrees, respectively.

More specifically, referring to FIG. 5, due to the orthogonal property of the orthogonal matching pursuit model of the present invention, the curve only presents an obvious peak value at the angle where the real number input signal matrix has a major correlation with the plurality of real number pursuit matrixes. Taking the second embodiment as an example, the curve only presents an obvious peak value at the angles (−10 degrees and 20 degrees) where the real number input signal matrix has a major correlation with the plurality of real number pursuit matrixes, while the curve is in a horizontal shape at the remaining angles. Therefore, the user is able to quickly and clearly know that there are target objects at the position of −10 degrees and 20 degrees, respectively, through the curve directly.

Thus, the present invention achieves following advantages.

The present invention converts the input signal matrix and the plurality of pursuit matrixes that are originally performed as a complex number into the real number input signal matrix and the plurality of real number pursuit matrixes performed with only real numbers through steps S1 and S2. Therefore, the originally two-dimensional calculation is improved into one-dimensional calculation, thereby improving the calculation efficiency.

Through the orthogonal property of the orthogonal matching pursuit model, the curve only presents an obvious peak value at the angle where the real number input signal matrix has a major correlation with the plurality of real number pursuit matrixes, so that the user is able to clearly know the positional angle of the target object.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A high angular resolution processing method for MIMO system; the method receiving an input signal matrix through a symmetric array antenna; the input signal matrix being a transmission signal or reflex signal of at least one target object; the method comprising:
sending the transmission signal toward the at least one target object;
receiving the reflex signal using the symmetric array antenna of the MIMO system;
step S1: outputting a conversion matrix according to an amount of the symmetric array antenna;
step S2: performing a real number conversion using the input signal matrix and a plurality of angle-related pursuit matrixes through the conversion matrix, so as to obtain a real number input signal matrix and a plurality of real number pursuit matrixes;
determining that the plurality of real number pursuit matrixes fulfill conditions of the orthogonal matching pursuit model; and
step S3: inputting the real number input signal matrix and the plurality of real number pursuit matrixes to an orthogonal matching pursuit model; obtaining an amount of the target object and an angle of a location corresponding to the target object based on determination.

2. The method of claim 1, wherein, in step S1, if the antenna of the symmetric array antenna is in an odd number, the conversion matrix is an odd number conversion matrix; if the antenna of the symmetric array antenna is in an even number, the conversion matrix is an even number conversion matrix.

3. The method of claim 2, wherein, the odd number conversion matrix is $$C = \frac{1}{\sqrt{2}} \begin{pmatrix} I_n & 0_{n \times 1} & jI_n \\ 0_{1 \times n} & \sqrt{2} & 0_{1 \times n} \\ J_n & 0_{n \times 1} & -jJ_n \end{pmatrix},$$

and the even number conversion matrix is $$C = \frac{1}{\sqrt{2}} \begin{pmatrix} I_n & jI_n \\ J_n & -jJ_n \end{pmatrix};$$

the C is the odd number conversion matrix or the even number conversion matrix; the $I_n$ is a unit matrix; the $J_n$ is an exchange matrix; and the j is an imaginary number unit.

4. The method of claim 2, wherein, in step S2, the input signal matrix and the plurality of pursuit matrixes are multiplied by the odd number conversion matrix or the even number conversion matrix, and then undergo the real number conversion, whereby the real number input signal matrix and the plurality of real number pursuit matrixes are obtained.

5. The method of claim 1, wherein step S3 further comprises a step S3a and a step S3b; in the step S3a, the orthogonal matching pursuit model compares if there is a correlation between the real number input signal matrix and the plurality of real number pursuit matrix; if there is no correlation between one of the plurality of real number pursuit matrixes and the real number input signal matrix, step S3a is repeated; if there is a correlation between one of the plurality of real number pursuit matrixes and the real number input signal matrix, the method proceeds to step S3b: calculating a residual value according to the plurality of real number pursuit matrixes that are correlated with the real number input signal matrix.

6. The method of claim 5, wherein, in step S3b, the plurality of real number pursuit matrixes that are correlated with the real number input signal matrix are defined as a first real number pursuit matrix, such that residual value is calculated with the first real number pursuit matrix and the real number input signal matrix.

7. The method of claim 6, wherein step S3 further comprises a step S3c and a step S3d; in the step S3c, the residual value is compared with a residual reference value; if the residual value presents a singular sharp reduction and is lower than or equal to the residual reference value, the orthogonal matching pursuit model obtains the amount and the angle of the target object; if the residual value is larger than the residual reference value, the method proceeds to step S3d: comparing a reduction degree of the residual value.

8. The method of claim 6, wherein, in step S3b, the orthogonal matching pursuit model calculates the residual value through a least square method.

9. The method of claim 5, wherein, in step S3a, a scope of angle of the plurality of real number pursuit matrixes ranges from −90 degrees to 90 degrees; the corresponding plurality of real number pursuit matrixes are orderly compared with the real number input signal matrix for correlation based on an interval angle unit.

10. The method of claim 9, wherein the interval angle ranges between 1/18 to 1/180 of the scope of angle of the plurality of real number pursuit matrixes.

* * * * *